US008560760B2

(12) United States Patent
Dhokia et al.

(10) Patent No.: US 8,560,760 B2
(45) Date of Patent: Oct. 15, 2013

(54) EXTENDING FLASH DRIVE LIFESPAN

(75) Inventors: Dilesh Dhokia, Kirkland, WA (US);
Mukesh Karki, Bellevue, WA (US);
Michael R. Fortin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 463 days.

(21) Appl. No.: 11/700,443

(22) Filed: Jan. 31, 2007

(65) Prior Publication Data
US 2008/0183918 A1 Jul. 31, 2008

(51) Int. Cl.
*G06F 12/00* (2006.01)

(52) U.S. Cl.
USPC .......................................... 711/103; 711/170

(58) Field of Classification Search
USPC ................. 711/103, 112, 105, 113, 170, 118; 365/189.11, 185.04
See application file for complete search history.

(56) References Cited

U.S. PATENT DOCUMENTS

| 5,568,423 | A | 10/1996 | Jou et al. |
| 5,680,579 | A | 10/1997 | Young et al. |
| 5,787,484 | A | 7/1998 | Norman |
| 5,835,935 | A | 11/1998 | Estakhri et al. |
| 5,893,139 | A | 4/1999 | Kamiyama |
| 6,145,069 | A | 11/2000 | Dye |
| 6,189,069 | B1 | 2/2001 | Parkes et al. |
| 6,418,506 | B1 | 7/2002 | Pashley et al. |
| 6,681,309 | B2 | 1/2004 | Szendy et al. |
| 6,681,506 | B2 | 1/2004 | Szendy et al. |
| 6,711,666 | B1 | 3/2004 | Feldman |
| 6,717,857 | B2 | 4/2004 | Byeon et al. |
| 6,728,794 | B2 | 4/2004 | Robinson et al. |
| 6,876,579 | B2 | 4/2005 | Liang et al. |
| 6,917,543 | B2 | 7/2005 | Sato |
| 6,938,116 | B2 | 8/2005 | Kim et al. |
| 7,020,758 | B2 | 3/2006 | Fisk |
| 7,080,193 | B2 | 7/2006 | Roohparvar |
| 7,087,953 | B2 | 8/2006 | Lee |
| 7,096,336 | B2 | 8/2006 | Furuhashi et al. |
| 7,127,550 | B1 | 10/2006 | Lin |
| 7,433,245 | B2 * | 10/2008 | Otsuka et al. ................. 711/103 |

(Continued)

FOREIGN PATENT DOCUMENTS

| CN | 1816795 A | 8/2006 |
| EP | 1 205 838 A2 | 5/2002 |

(Continued)

OTHER PUBLICATIONS

Park, et al., "Compressed Swapping for NAND Flash Memory Based Embedded Systems", Date: 2005, vol. 3553/2005, Springer Berlin / Heidelberg, http://www.springerlink.com/content/8t75tw9kcja4br62/.

(Continued)

*Primary Examiner* — Pierre-Michel Bataille
(74) *Attorney, Agent, or Firm* — Microsoft Corporation

(57) ABSTRACT

In a computer-implemented method for filtering input/output operations of a flash drive, an input/output request directed toward a flash drive is received. It is determined whether the input/output request is associated with a high volume write operation. If the input/output request is associated with the high volume write operation, a flash drive input/output management action to perform is selected. If the input/output request is not associated with the high volume write operation, the input/output request is forwarded to the flash drive.

20 Claims, 7 Drawing Sheets

(56) References Cited

U.S. PATENT DOCUMENTS

| | | | |
|---|---|---|---|
| 7,454,446 | B2 | 11/2008 | Leung et al. |
| 7,509,420 | B2 | 3/2009 | Moulton et al. |
| 7,555,575 | B2 | 6/2009 | Kaneda |
| 7,747,812 | B2* | 6/2010 | Kirschner et al. ............ 711/103 |
| 7,814,128 | B2 | 10/2010 | Silvers et al. |
| 2002/0116575 | A1 | 8/2002 | Toyomura et al. |
| 2002/0174227 | A1 | 11/2002 | Hartsell et al. |
| 2003/0046396 | A1 | 3/2003 | Richter et al. |
| 2003/0050087 | A1 | 3/2003 | Kwon |
| 2004/0054850 | A1 | 3/2004 | Fisk |
| 2004/0111389 | A1 | 6/2004 | Pudipeddi et al. |
| 2005/0010620 | A1 | 1/2005 | Silvers et al. |
| 2005/0021905 | A1 | 1/2005 | Kwon |
| 2005/0036387 | A1* | 2/2005 | Seal et al. .................. 365/222 |
| 2005/0120137 | A1 | 6/2005 | Moulton et al. |
| 2005/0154821 | A1 | 7/2005 | Furuhashi et al. |
| 2005/0160218 | A1 | 7/2005 | See et al. |
| 2005/0256838 | A1 | 11/2005 | Lasser |
| 2006/0069896 | A1 | 3/2006 | Sanders |
| 2006/0161635 | A1 | 7/2006 | Lamkin et al. |
| 2006/0179212 | A1 | 8/2006 | Kim et al. |
| 2006/0203548 | A1 | 9/2006 | You |
| 2006/0224820 | A1 | 10/2006 | Cho et al. |
| 2006/0248259 | A1 | 11/2006 | Ryu et al. |
| 2006/0277360 | A1 | 12/2006 | Sutardja et al. |
| 2007/0150891 | A1 | 6/2007 | Shapiro |
| 2007/0183198 | A1* | 8/2007 | Otsuka et al. ............ 365/185.04 |
| 2008/0126673 | A1* | 5/2008 | Kaneda .................... 711/103 |
| 2008/0215800 | A1* | 9/2008 | Lee et al. .................. 711/103 |
| 2008/0228998 | A1* | 9/2008 | Colecchia et al. ............ 711/103 |
| 2009/0193184 | A1* | 7/2009 | Yu et al. .................... 711/103 |

FOREIGN PATENT DOCUMENTS

| | | |
|---|---|---|
| EP | 1 720 119 A1 | 8/2006 |
| JP | 2000-036947 | 2/2000 |
| JP | 2000-201333 | 7/2000 |
| JP | 2002-132454 | 5/2002 |
| JP | 2004-362530 | 12/2004 |
| JP | 2006-155606 | 6/2006 |
| JP | 2007004710 | 1/2007 |
| RU | 2178949 C2 | 1/2002 |
| RU | 2189630 C1 | 9/2002 |
| WO | 9217844 A1 | 10/1992 |
| WO | 9815056 A1 | 4/1998 |
| WO | WO9843248 A1 | 10/1998 |
| WO | 9918507 A1 | 4/1999 |
| WO | 2005012540 A1 | 2/2005 |
| WO | 2005050453 A1 | 6/2005 |

OTHER PUBLICATIONS

Wu, et al., "eNVy: A Non-Volatile, Main Memory Storage System", Date: 1994, pp. 86-97, ACM Press, New York, USA, http://delivery.acm.org/10.1145/200000/195506/p86-wu.pdf?key1=195506&key2=7962894611&coll=GUIDE&dl=GUIDE&CFID=5868121&CFTOKEN=19944617.

Yim, et al., "A Flash Compression Layer for SmartMedia Card Systems", Date: Feb. 2004, vol. 50, No. 1, http://ieeexplore.ieee.org/iel5/30/28566/01277861.pdf?arnumber=1277861&htrv=1.

International Search Report in related application No. PCT/US2008/052709 dated Jun. 10, 2008.

Chinese Office Action in related application No. 200880003570.9 dated Dec. 3, 2010.

Non-Final Office Action in related U.S. Appl. No. 11/714,585 dated Mar. 20, 2009.

Notice of Allowance in related U.S. Appl. No. 11/714,585 dated Oct. 19, 2009.

Non-Final Office Action in related U.S. Appl. No. 12/639,242 dated Sep. 17, 2010.

Notice of Allowance in related U.S. Appl. No. 12/639,242 dated Jan. 7, 2011.

Chinese Office Action in related application No. 200880007412.0 dated Nov. 12, 2010.

European Search Report in related application No. 08731525.5 dated Aug. 27, 2010.

International Search Report in related application No. PCT/US08/056026 dated Jul. 31, 2008.

Japanese Office Action in related application No. 2009-552886 dated Dec. 1, 2010.

"Flash Memories" Oct. 2006, http://www.st.com/stonline/press/news/back2005/b9021m.htm.

Toshiba Develops Five- and Six-Chip Multi-Chip Packages Combining nor Flash, Sram, Pseudo Sram and Nand Flash for Advanced Cell Phone Applications, Apr. 14, 2003, http://www.toshiba.com/taec/news/press_releases/2003/to-299.jsp.

Ari; et al., "SANBoost:Automated SAN-Level Caching in Storage Area Networks", Proceedings of the International Conference on Autonomic Computing, 2004, pp. 164-171.

Notice of Allowance cited in related U.S. Appl. No. 12/639,242 dated Aug. 22, 2011.

Notice of Allowance cited in U.S. Appl. No. 12/639,242 dated May 5, 2011.

International Preliminary Report on Patentability cited in PCT Application No. PCT/US2008/056026 dated Sep. 17, 2009.

Supplemental EP Search Report cited in EP Application No. 08731525.5 dated Sep. 14, 2010

Second Chinese Office Action cited in Chinese Application No. 200880003570.9 dated May 11, 2011.

Second Chinese Office Action cited in Chinese Application No. 200880007412.0 dated Jun. 29, 2011.

Int. Preliminary Report on Patentability cited in PCT Application No. PCT/US2008/052709 dated Aug. 13, 2009.

Notice of Allowance cited in related U.S. Appl. No. 12/639,242 dated Dec. 13, 2011.

EP Communication cited in related EP Application No. 08731525.5 dated Aug. 12, 2011.

Japanese Office Action cited in related Japanese Application No. 2009-552886 dated Jun. 24, 2011.

Russian Office Action cited in Russian Application No. 2009129412 dated Oct. 19, 2011.

Russian Notice of Allowance cited in Russian Application No. 2009129412 dated Dec. 7, 2011.

Reply to Non-Final Office Action cited in U.S. Appl. No. 12/639,242 dated Dec. 17, 2010, 16 pgs.

Amendment after Notice of Allowance cited in U.S. Appl. No. 12/639,242 dated Dec. 23, 2011, 12 pgs.

Reply to first Chinese Office Action cited in Chinese Application No. 200880007412.0 dated Mar. 28, 2010, 15 pgs.

Reply to second Chinese Office Action cited in Chinese Application No. 200880007412.0 dated Sep. 8, 2011, 15 pgs.

Chinese Notice of Allowance cited in Chinese Application No. 200880007412.0 dated Apr. 20, 2012, 4 pgs.

Reply to Chinese Office Action cited in Chinese Application No. 200880003570.9 dated Apr. 13, 2011, 9 pgs.

Reply to second Chinese Office Action cited in Chinese Application No. 200880003570.9 dated Jul. 21, 2011, 11 pgs.

Chinese Notice of Allowance cited in Chinese Application No. 200880003570.9 dated Mar. 1, 2012, 4 pgs.

Reply to EP Communication cited in EP Application No. 08731525.5 dated Dec. 2, 2011, 14 pgs.

Reply to EP Communication cited in EP Application No. 08731525.5 dated Mar. 9, 2011, 12 pgs.

EP Search Report cited in EP Application No. 08728762.9 dated Nov. 22, 2012, 7 pgs.

Reply to Japanese Office Action cited in Japanese Application No. 2009-552886 dated Feb. 2, 2011, 5 pgs.

Japanese Notice of Allowance cited in Japanese Application No. 2009-552886 dated Dec. 20, 2012, 1 pg.

Japanese Office Action cited in Japanese Application No. 2009-548458 dated Nov. 16, 2012, 3 pgs.

Russian Notice of Allowance cited in Russian Application No. 2009129412 dated Dec. 7, 2011, 6 pg.

EP Communication cited in EP Application No. 0872876.2 dated Jul. 25, 2013, 4 pgs.

Japanese Final Office Action cited in Japanese Application No. 2009-548458 dated Jun. 21, 2013, 434 pgs.

* cited by examiner

700

RECEIVING AN INPUT/OUTPUT REQUEST, THE INPUT/OUTPUT REQUEST DIRECTED TOWARD A FLASH DRIVE FROM AN OPERATING SYSTEM.
710

DETERMINING A NATURE OF THE INPUT/OUTPUT REQUEST.
720

PERFORMING A FLASH DRIVE INPUT/OUTPUT MANAGEMENT ACTION BASED ON THE NATURE OF THE INPUT/OUTPUT REQUEST, SUCH THAT A NUMBER OF WRITE OPERATIONS PERFORMED TO THE FLASH DRIVE BY THE OPERATING SYSTEM IS REDUCED WHILE MAINTAINING INTEGRITY OF THE OPERATING SYSTEM
730

FIG. 7

EXTENDING FLASH DRIVE LIFESPAN

BACKGROUND

When reading and writing to a variety of locations on a mechanical hard disk drive, there are often latencies involved due to the seek time required for a hard disk drive head to move from place to place on a disk. However, flash memory is a solid state recording mechanism with no moving parts, and thus has a faster read access time than a mechanical hard drive. This is because reading from a flash drive does not suffer from latency due to head-seek time, as typically will be the case with a mechanical hard drive. Because of this, reading from a flash drive can be more than ten times faster than reading from a mechanical drive. This improved read speed is one reason that flash drives are replacing mechanical hard disk drives in many computing uses.

Memory space in typical flash drives is organized in regions or arrays called cells. A limitation of flash memory is that, while it can be randomly read and written, it can only be block erased or cleared. A cell in a flash drive can physically wear out over time after some finite number of clear operations is performed on the cell as part of the writing/re-writing process. Typically the number of clear operation cycles required to wear out a cell is in the range of around 100,000 to 1,000,000 clear operations.

Typically, when data in a cell needs to be re-written, the old data is marked as invalid and the replacement data is written to an available area in the cell. When no more room is available in the cell, the cell is block cleared and new data is then written to the cleared cell along with valid data that was copied out of the cell before it was cleared. This clearing frees up the previously invalid portions of the cell to be written to again. This process for writing data in a flash drive is but one technique of "wear leveling" employed in flash drives in an endeavor to limit the number of clearing operations performed to a cell.

As flash drives are becoming larger and more common they are being used more and more as supplemental storage and also as primary storage media in place of mechanical disk drives. Because of this increased reliance on flash drives, use with certain programs and/or applications will cause cells in a flash drive to be overstressed. This will result in a shortened life span for the flash drive, in spite of the employment of current wear-leveling techniques. A shortened lifespan is not desirable, particularly when a flash memory is used as primary storage.

Thus, a technology which addresses some of the above disadvantages and shortcomings of flash drives would be advantageous.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a computer-implemented method for filtering input/output operations of a flash drive, an input/output request directed toward a flash drive is received. It is determined whether the input/output request is associated with a high volume write operation. If the input/output request is associated with the high volume write operation, a flash drive input/output management action to perform is selected. The selected flash drive input/output management action may comprise a management action such as, but not limited to: managing compressing of data being written as a result the input/output request; managing decompressing of compressed data being read as a result of the input/output request; managing buffering of the input/output request; or managing redirecting of the input/output request to a peripheral solid state storage drive. If the input/output request is not associated with the high volume write operation, the input/output request is forwarded to the flash drive.

The filtering of flash drive input/output operations and the management of high volume write operations directed toward the flash drive act together to reduce write operations which would otherwise be written to the flash drive in the course of normal operation. This reduction in write operations to the flash drive decreases the clear operations performed upon cells in the flash drive, thereby extending the lifespan of the flash drive.

DESCRIPTION OF THE DRAWINGS

The accompanying drawings, which are incorporated in and form a part of this specification, illustrate embodiments of the technology for extending flash drive lifespan and, together with the description, serve to explain principles discussed below:

FIG. 7 is a flow diagram of operations performed in accordance with one embodiment of the present technology.

Figure 1:
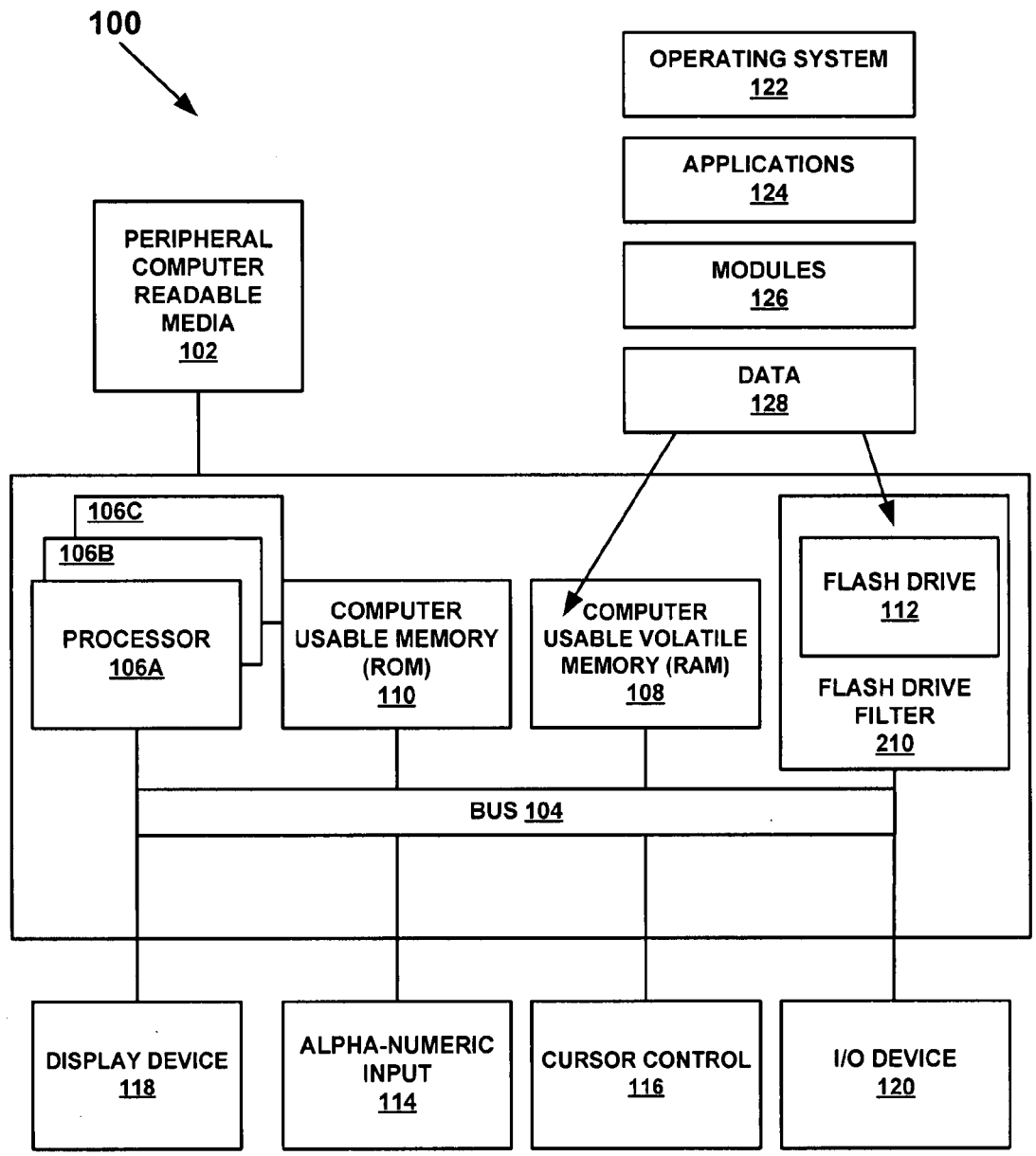
FIG. 1 is a diagram of an example computer system usable in conjunction with embodiments of the present technology for extending flash drive lifespan.

The drawings referred to in this description should be understood as not being drawn to scale unless specifically noted.

DETAILED DESCRIPTION

Reference will now be made in detail to embodiments of the present technology for extending flash drive lifespan, examples of which are illustrated in the accompanying drawings. While the technology for extending flash drive lifespan will be described in conjunction with various embodiments, it will be understood that they are not intended to limit the present technology for extending flash drive lifespan to these embodiments. On the contrary, the embodiments of the present technology for extending flash drive lifespan are intended to cover alternatives, modifications and equivalents, which may be included within the spirit and scope the various embodiments as defined by the appended claims. Furthermore, in the following detailed description, numerous specific details are set forth in order to provide a thorough understanding of the embodiments of the present technology for extending flash drive lifespan. However, various embodiments for the present technology for extending flash drive lifespan may be practiced without these specific details. In other instances, well known methods, procedures, components, and circuits have not been described in detail as not to unnecessarily obscure aspects of the presented embodiments.

Unless specifically stated otherwise as apparent from the following discussions, it is appreciated that throughout the present detailed description, discussions utilizing terms such as "receiving", "determining", "selecting", "forwarding", "managing", "compressing", "decompressing", "writing", "reading", "resolving", "performing", "intercepting", or the like, refer to the actions and processes of a computer system (such as computer system 100 of FIG. 1), or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Embodiments of the present technology for extending flash drive lifespan are also well suited to the use of other computer systems such as, for example, optical and virtual computers. Furthermore, it is appreciated that embodiments of the technology for extending flash drive lifespan can also be used in extending the lifespan of other solid state storage devices which have similar hardware characteristics to those of flash drives. Additionally, it should be understood that in some embodiments of the present technology for extending flash drive lifespan, one or more of the steps can be performed manually.

Overview of Discussion

Discussion will begin with a description of an example computer system environment with which, or within which, embodiments of the present technology may operate. Discussion will proceed to a description of an example module, in the form of a flash drive filter, which operates to extend the life of a flash drive. Components of the flash drive filter will be briefly described. Operation of the flash drive filter and its components will then be described in more detail in conjunction with a description of an example method for filtering input/output operations of a flash drive, and also in conjunction with an example method for extending a lifespan of a flash drive used as primary storage for an operating system.

Example Computer System Environment

With reference now to FIG. 1, all or portions of various embodiments of the technology for extending flash drive lifespan are composed of computer-readable and computer-executable instructions that reside, for example, in computer-usable media of a computer system. That is, FIG. 1 illustrates one example of a type of computer that can be used to implement embodiments, which are discussed below, of the present technology for extending flash drive lifespan. FIG. 1 illustrates an example computer system 100 used in accordance with embodiments of the present technology for extending flash drive lifespan. It is appreciated that system 100 of FIG. 1 is only an example and that embodiments of the present technology for extending flash drive lifespan can operate on or within a number of different computer systems including general purpose networked computer systems, embedded computer systems, routers, switches, server devices, client devices, various intermediate devices/nodes, stand alone computer systems, media centers, portable computer systems, handheld devices, and the like. As shown in FIG. 1, computer system 100 of FIG. 1 is well adapted to having peripheral computer readable media 102 such as, for example, a floppy disk, a compact disc, and the like coupled thereto.

System 100 of FIG. 1 includes an address/data bus 104 for communicating information, and a processor 106A coupled to bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g. random access memory (RAM), coupled to bus 104 for storing information and instructions for processors 106A, 106B, and 106C. System 100 also includes computer usable non-volatile memory 110, e.g. read only memory (ROM), coupled to bus 104 for storing static information and instructions for processors 106A, 106B, and 106C. Also present in system 100 is a flash drive 112 which is a solid state flash memory device used as a primary storage. As shown in FIG. 1, flash drive 112 is coupled to bus 104, via flash drive filter 210. Flash drive 112 is used for storing information and instructions for computer system 100. In some embodiments system 100 may additionally, or alternatively, be configured with an additional storage device (such as a magnetic or optical disk and disk drive) which may be used in conjunction with flash drive 112 as primary storage.

System 100 also includes an optional alphanumeric input device 114 including alphanumeric and function keys coupled to bus 104 for communicating information and command selections to processor 106A or processors 106A, 106B, and 106C. System 100 also includes an optional cursor control device 116 coupled to bus 104 for communicating user input information and command selections to processor 106A or processors 106A, 106B, and 106C. System 100 of the present embodiment also includes an optional display device 118 coupled to bus 104 for displaying information.

Referring still to FIG. 1, optional display device 118 of FIG. 1 may be a liquid crystal device, cathode ray tube, plasma display device or other display device suitable for creating graphic images and alphanumeric characters recognizable to a user. Optional cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, joystick or special keys on alpha-numeric input device 114 capable of signaling movement of a given direction or manner of displacement. Alternatively, it will be appreciated that a cursor can be directed and/or activated via input from alpha-numeric input device 114 using special keys and key sequence commands. System 100 is also well suited to having a cursor directed by other means such as, for example, voice commands. System 100 also includes an I/O device 120 for coupling system 100 with external entities. For example, in one embodiment, I/O device 120 is a modem for enabling wired or wireless communications between system 100 and an external network such as, but not limited to, the Internet. In another embodiment, for example, I/O device 120 is a universal serial bus (USB) port. In an embodiment where I/O device 120 is a USB port, a peripheral storage (e.g., a solid state storage or mechanical disk drive) may be coupled thereto for use with embodiments of the present technology. Some examples of a solid state storage include a memory card or a portable flash drive.

Referring still to FIG. 1, various other components are depicted for system 100. Specifically, when present, an operating system 122, applications 124, modules 126, and data 128 are shown as typically residing in one or some combination of computer usable volatile memory 108, e.g. random access memory (RAM), and data storage unit 112.

In some embodiments, the present technology for extending flash drive lifespan is implemented an application 124 or module 126 such as a device driver, which may be located in memory locations within RAM 108, stored on peripheral computer readable media 102, or stored on media of flash drive 112. In various embodiments, as will be described herein, the present technology for extending flash drive lifespan operates as a flash drive filter 210, which comprises all or a portion of a module which receives and filters input/output requests directed toward flash drive 112. In such an embodiment, as shown in FIG. 1, computer system 100 (and/or flash drive 112) is well adapted to having or be coupled with flash drive filter 210.

Flash Drive Filter

Figure 2:
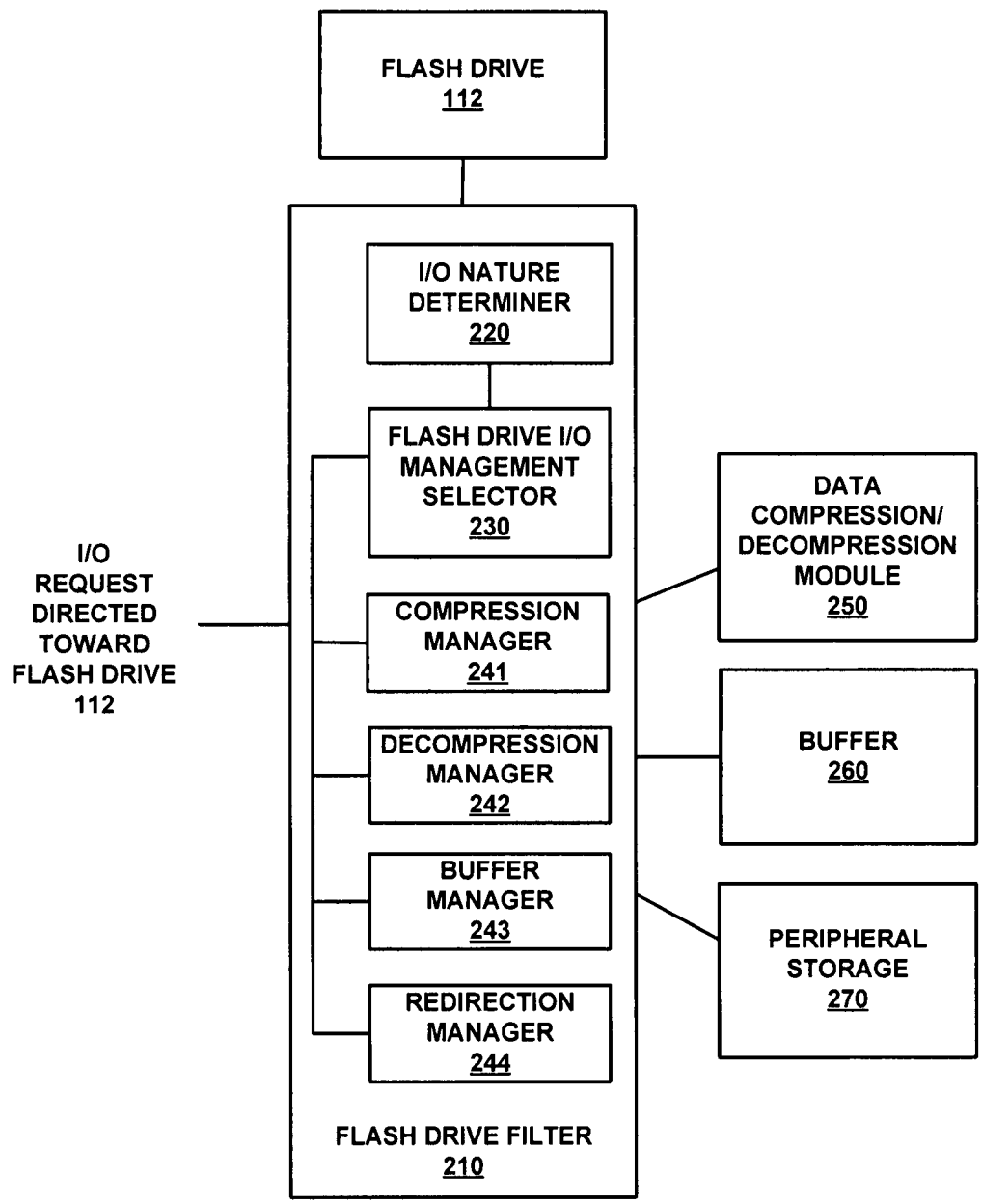
FIG. 2 shows an example flash drive filter according to one embodiment of the present technology.

Referring now to FIG. 2, FIG. 2 shows an example flash drive filter 210 according to one embodiment of the present technology. Flash drive filter 210 is a module for reducing write operations to a flash drive, such as flash drive 112. For example, in one embodiment flash drive filter 210 is implemented as a software layer or module, such as part of the operating system. In yet another embodiment, flash drive filter 210 is implemented as all or part of a firmware module. In yet another embodiment flash drive filter 210 is implemented in a hardware module. As shown in the example embodiment of FIG. 2, flash drive filter 210 is comprised of an Input/Output (I/O) nature determiner 220, a flash drive I/O management selector 230, a compression manager 241, a decompression manager 242, a buffer manager 243, and a redirection manager 244. Flash drive filter 210 is coupled with, or configured to couple with, a flash drive to reduce write and clear operations to the flash drive. The lifespan of the media of the flash drive, which can only survive a limited number of clear operations, is thereby increased as a result of the filtering performed by flash drive filter 210.

For purpose of example, and not of limitation, flash drive filter 210 is shown coupled with a data compression/decompression module 250, a buffer 260, and a peripheral storage 270. It is appreciated however, that in various embodiments, one or more of these couplings may be optional, if such functionality as is offered by data compression/decompression module 250, buffer 260, or peripheral storage 270 is not required by a particular embodiment. Likewise it is appreciated that in various embodiments, the functionality of one or more of data compression/decompression module 250, buffer 260, and peripheral storage 270 may be incorporated into flash drive filter 210 rather than being accessed via a coupling to an external entity as shown.

Data compression/decompression module 250 operates under the management of flash drive filter 210 to perform data compression or decompression in conjunction with selected intercepted I/O requests. For example, in one embodiment data compression/decompression module 250 compresses a selected write operation that that was initially directed toward the flash drive but becomes redirected to data compression/decompression module 250 by flash drive filter 210. Similarly, under management from flash drive filter 210, data compression/decompression module 250 decompresses compressed data read from a flash drive. In some embodiments, data compression/decompression module 250 also performs data encryption during data compression and data decryption during data decompression.

Buffer 260 is utilized under the management of flash drive filter 210 for receiving a selected intercepted I/O request when the I/O request is buffered by flash drive filter 210. In one embodiment, random access memory, such as a portion of RAM 108 (FIG. 1) is utilized as buffer 260.

Peripheral storage 270 is utilized under management of flash drive filter 210 for receiving a selected input/output request when the input/output request is redirected from the flash drive by flash drive filter 210. Peripheral storage 270 may be a mechanical hard disk drive or a solid state storage. Some examples of a solid state storage are a memory card and an external USB flash drive such as a portable flash drive.

Operation of a Flash Drive Filter

As shown in FIG. 2, flash drive filter 210 operates to intercept an I/O request that is directed toward a flash drive being filtered. The I/O request is received, for example, from an operating system or application running upon computer system 100. As shown by FIG. 1 and FIG. 2, flash drive 112 is one example of a flash drive with which flash drive filter 210 may be coupled. For purposes of example, and not of limitation, various examples herein illustrate the use of flash drive filter 210 to filter I/O requests directed toward flash drive 112, which operates as the primary storage for computer system 100. It is appreciated that embodiments of the technology described herein may be similarly used to extend the life of other flash drives, such as, for example, a portable flash drive that is removably coupled with an I/O device 120 of computer system 100.

Input/output nature determiner 220 determines a nature of an I/O request. After the I/O request to flash drive 112 is intercepted, I/O nature determiner 220 of flash drive filter 210 analyzes the I/O request to determine its nature. For example, in one embodiment, I/O nature determiner 220 operates to determine if the I/O request is a high volume write request. Similarly, in one embodiment, I/O nature determiner 220 further operates to determine a specific category of a high volume write request that the intercepted I/O request belongs to. In one embodiment, if I/O nature determiner 220 determines that the intercepted I/O request is not associated with a high volume write request, the I/O request is forwarded to flash drive 112.

Flash drive input/output management selector 230 selects a flash drive input/output management action based upon the nature of the input/output request. Following the previous example, flash drive I/O management selector 230 receives the nature of an intercepted I/O request from I/O nature determiner 220. Based upon the nature of the intercepted I/O request, flash drive I/O management selector 230 selects the manner that the I/O request will be managed. Flash drive I/O management selector 230 does this by selecting an I/O manager, and thus the management action to be performed upon the I/O request, from the available I/O managers (241, 242, 243, and 244) that flash drive filter 210 is configured with. In some embodiments, such as where flash drive filter 210 is configured with only one I/O manager, flash drive I/O management selector 230 may not be required.

A flash drive input/output manager (241, 242, 243, 244), is configured to manage the performance of a flash drive input/output management action which contributes towards reducing write operations to the flash drive. Following the previous example, once selected, the flash drive input/output manager (241, 242, 243, 244) manages the intercepted I/O request in such a way as to ensure that the total number of write operations performed to flash drive 112 is reduced. The reduction in write operations reduces the need to perform clear operations upon the cells of flash drive 112, thus extending the lifespan of flash drive 112. Flash drive filter 210 is shown configured with four flash drive I/O managers (241, 242, 243, 244). It is appreciated that in various embodiments greater or lesser number of flash drive I/O managers than shown in FIG. 2 may be included in flash drive filter 210. Likewise, it is appreciated that in some embodiments, functionality of one or more flash drive I/O managers may be accessed by or included within another flash drive I/O manager.

Compression manager 241 manages compression of selected intercepted I/O requests that are directed toward flash drive 112. In one embodiment compression manager 241 is used to selectively compress all, or some subset, of I/O requests that are determined to be associated high volume write operations. For example, data for a selected write operation is directed to data compression/decompression module 250 where it is compressed into compressed data. In some embodiments, after compression, compression manager 241 then directs that the compressed data be written to flash drive 112. Alternatively, in some embodiments, after compression, compression manager 241 then directs that the compressed data be written to buffer 260 or to peripheral storage 270. Buffered compressed data may then, in some embodiments, be written to flash drive 112 after a buffer threshold expires. By compressing the data, the number of write operations to flash drive 112 is reduced, thus reducing the number of clear operations performed upon cells of flash drive 112.

Decompression manager 242 manages decompression of compressed data which is being requested to be read from flash drive 112, buffer 260, or peripheral storage 270 in accordance with an intercepted I/O request. In one embodiment, the compressed data being read was previously compressed following the interception of an I/O request associated with a high volume write operation. Decompression manager 242 manages the reading of the compressed data from the location where it is stored and then directs the compressed data toward data compression/decompression module 250, where it is decompressed. Decompression manager 242 then directs the decompressed data to the end recipient of the data as specified by the intercepted I/O request.

Buffer manager 243 manages buffering of a received I/O request which is stored at least temporarily in buffer 260. Another function of buffer manager 243 is resolving repeated, redundant, or overlapping writes of data that are written to buffer 260 as a result of a succession of I/O requests. Resolving is performed, in one embodiment, in a situation where a first version of a unit of data is written to buffer 260 and then a subsequent, altered or identical version of the same unit of data is then written to buffer 260 while the first version of the data is still present. In one embodiment, buffer manager 243 resolves the two versions of the same unit of data in this situation by either updating the first version with the altered information, or discarding the first version and keeping only the second version.

The resolved version of the data unit is considered updated data. In an instance where the unit of data resolved is compressed data, the resolved version of is considered updated compressed data. Buffer manager 243 reduces subsequent writes of the buffered data to flash disk 112 or to peripheral storage 270 by resolving multiple versions of a unit of data which are written to buffer 260. This eliminates redundant writes of a data unit and/or re-writes of a data unit which would otherwise be necessary. Operating system writes to a registry file are one example of high volume write operation which may be temporarily stored and resolved in buffer 260 to reduce writes to flash drive 112.

Redirection manager 244 redirects a received I/O request to be written to another location instead of to flash drive 112. For example, in one embodiment, redirection manager 244 redirects selected I/O requests to be written to peripheral storage 270 instead of to flash drive 112. In such an embodiment, this can comprise an intermediate step of redirecting a write of an I/O request to buffer 260 and then subsequently, after a buffer threshold is exceeded, to peripheral storage 270. Such redirection reduces the number of write operations which would otherwise be written to flash drive 112. In one embodiment, for example, peripheral storage 270 is an inexpensive portable flash drive used to sacrificially receive writes of high volume operations so that the lifespan of flash drive 112 may be extended. In such an embodiment, the decision to perform redirection of an I/O request may be based on the presence of a peripheral storage 270 or a buffer 260 to which the I/O request may be redirected.

The decision to perform redirection will also be based upon the nature of the I/O request. In many instances peripheral storage 270 may be easily (and perhaps abruptly) removable; because of this, in one embodiment, only data of low importance but high volume write operations will be redirected. This will prevent the loss of important data, which might, for example, disable an operating system or application in the event that peripheral storage 270 is removed.

One example of a high volume write operation is a write to a page file of an operating system. Other examples of a high volume write operation are write operations performed by prefetching applications or search indexing applications which are in use on a computer system.

With respect to page files, these are generally used to assist an operating system in creating additional usable memory in excess of a limited amount of random access memory that exists within a computer system. Additional memory can be created and used through techniques of virtual memory. To utilize such techniques, some operating systems divide memory into chunks called pages. The size of a page can vary from one operating system to another, but the concept of pages remains the same. The "pages" of virtual memory may be available in memory (RAM for example), but will also be backed up in a page file that is stored, for example, to primary storage such as flash drive 112.

In normal operation of an operating system there are different types of pages. Some pages of memory are read-only. An executable file is an example of a read-only page. Some pages of memory are both read and write. An example of a read and write page is user data, such as, for instance, a page of user data memory allocated to a word processor. This page of user data memory may be read from and written to as changes are made during the writing or editing of a document with the word processor. If this word processor document is minimized, so that another program may be used, pages that were previously in memory are all written to primary storage so that other pages may replace them in active use in the available RAM.

As can be seen, during normal operation of a computer, such as computer system 100, considerable reading and writing typically takes place within the page files of the virtual memory. Though the memory is referred to as virtual, the considerable reads and writes are real, and are performed to a real storage location such as memory cells within flash drive 112.

Figure 3:
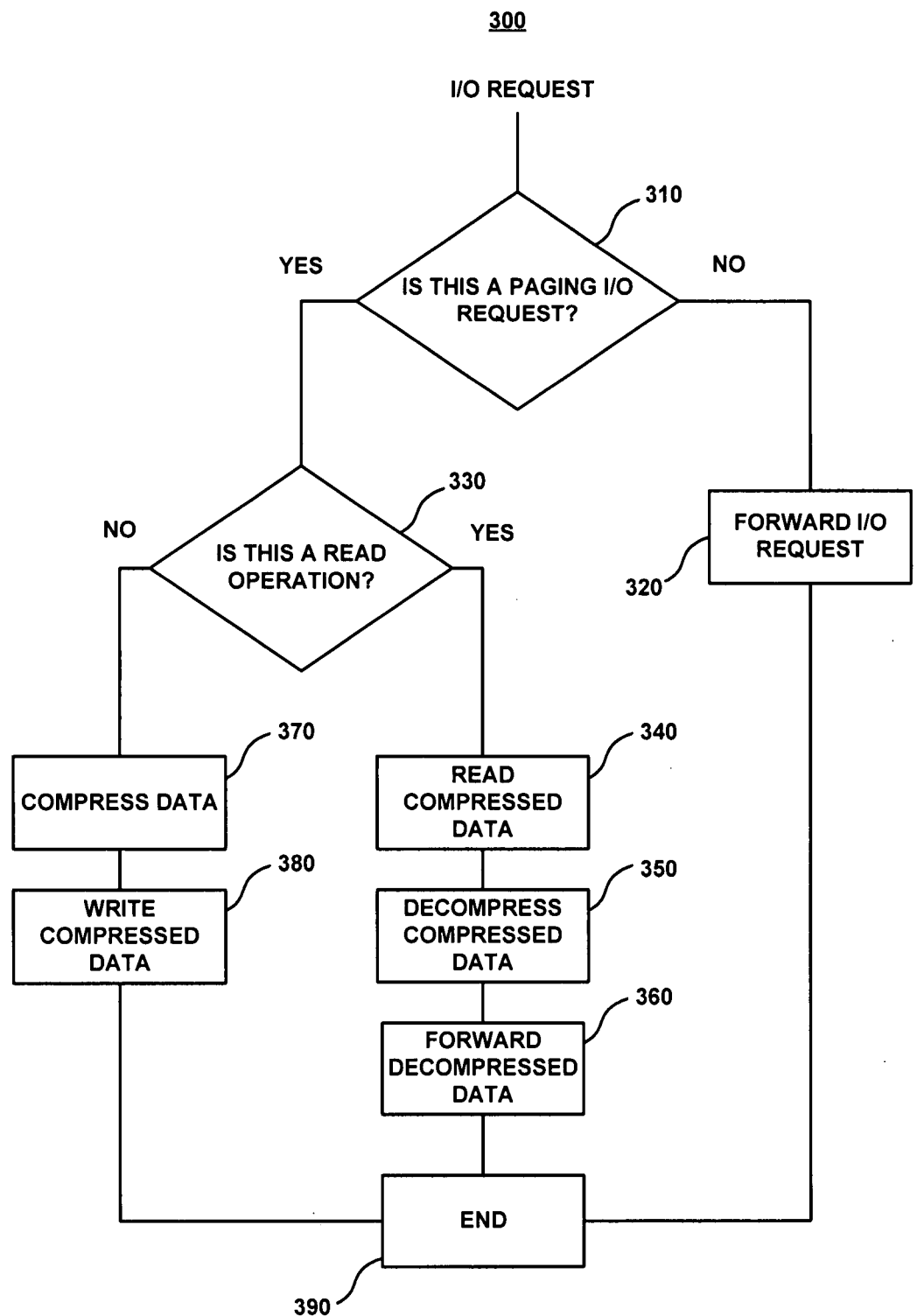
FIG. 3 is a flow diagram of operations performed in accordance with one embodiment of a flash drive filter of the present technology.

FIG. 3 is a flow diagram 300 of operations performed in accordance with one embodiment of a flash drive filter 210 of the present technology. Flow diagram 300 shows operations performed upon a subject I/O request directed toward a flash drive, such as flash 112. The subject I/O request is one which has been intercepted by an embodiment of flash drive filter 210 that is configured to utilize data compression and decompression to reduce writes associated with paging requests of an operating system.

In step 310, in one embodiment, I/O nature determiner 220 receives an I/O request directed toward flash drive 112. I/O nature determiner 220 determines if the I/O request is associated with a high volume write operation. In the present instantiation of flash drive filter 210, this comprises determining if the I/O request is a paging I/O request. If not, the I/O request is forwarded at step 320 to, for example, flash drive 112. After the I/O request is forwarded, this branch of flow diagram 300 then ends at step 390.

As shown in step 330, in one embodiment, if the I/O request is associated with a paging request, flash drive I/O management selector 230 is used to determine if the I/O request is a read operation or a write operation. If the I/O request is a read operation, then the flow diagram proceeds to step 340, if not, then the flow diagram proceeds to step 370.

At step 340, in one embodiment, decompression manager 242 is utilized to manage decompression actions performed upon data being read per the I/O request. For example, decompression manager 242 directs the compressed data to be read from the location in which it is stored. The compressed data may be stored, for example on flash drive 112, in buffer 260, or in peripheral storage 270. At step 350, decompression manager 242 then directs the compressed data to data compression/decompression module 250, where it is decompressed into decompressed data. At step 360 decompression manager 242 then directs the decompressed data to be forwarded as required per the intercepted I/O request. This branch of flow diagram 300 then ends at step 390.

At step 370, in one embodiment, compression manager 241 is utilized to manage compression actions performed upon data being written per the I/O request. Data being written per the I/O request is directed by compression manager 241 to data compression/decompression module 250, where it is compressed into compressed data.

At step 380, compression manager 241 directs the compressed data to be written. This can comprise writing the compressed data directly to flash drive 112. This can also comprise writing the compressed data associated with an I/O request either to buffer 260 or to peripheral storage 270. This can also comprise writing the compressed data associated with an I/O request to buffer 260, and then, after a buffer threshold is exceeded writing the compressed data to either flash drive 112 or peripheral storage 270. As previously described herein, this may also include resolving redundant, repeated, or overlapping versions of the compressed data which are written to buffer 260. This branch of flow diagram 300 then ends at step 390.

Applications such as prefetching and search indexing (previously mention herein) are typically used to make a computer run faster for a user. These applications typically increase the number of reads from flash drive 112, but can also increase the number of writes to flash drive 112 due to updates being written to their associated index or database files. This is an increase in writes over the typical level that flash drive 112 would experience without the use of these technologies. In one embodiment, data of high volume write operations associated with files of prefetching and/or search indexing applications is managed manner similar to the compression and decompression of paging I/O requests that is illustrated in flow diagram 300 of FIG. 3.

Figure 4:
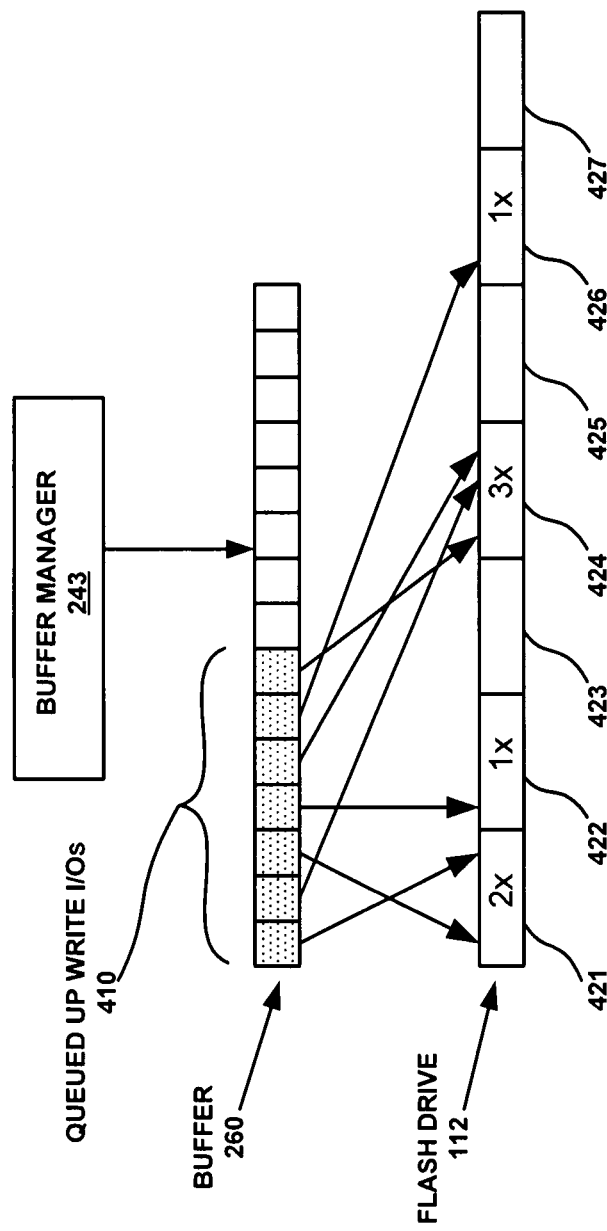
FIG. 4 shows one example of buffering management actions performed in accordance with an embodiment of the present technology.

FIG. 4 shows one example of buffering management actions performed in accordance with an embodiment of the present technology. FIG. 4 shows buffer manager 243 managing buffer 260 as a FIFO (first in first out) type buffer. As shown by FIG. 4, successive writes to buffer 260 are queued up from left to right. Buffer 260 is emptied and written to flash drive 112 when buffer 260 becomes full or when a designated buffer threshold is exceeded. One example of a buffer threshold is the expiration of a timer associated with buffer 260. Another example of a buffer threshold is a pre-specified level of fullness of buffer 260 being exceeded. Queued up writes 410 are then written in order of receipt to the cells (421, 422, 423, 424, 425, 426, 427) of flash drive 112. As can be seen, this results in two writes to cell 421, one write to cell 422, three writes to cell 424, and one write to cell 426. In one embodiment, by resolving redundant, repeated, or overlapping versions of data (as previously described), the total number of writes to flash drive 112 is reduced by allowing a data unit to be committed to flash drive 112 in a single write operation instead of in multiple write operations. In such an embodiment, the FIFO operation is modified slightly to allow for resolving data within buffer 260.

Figure 5:
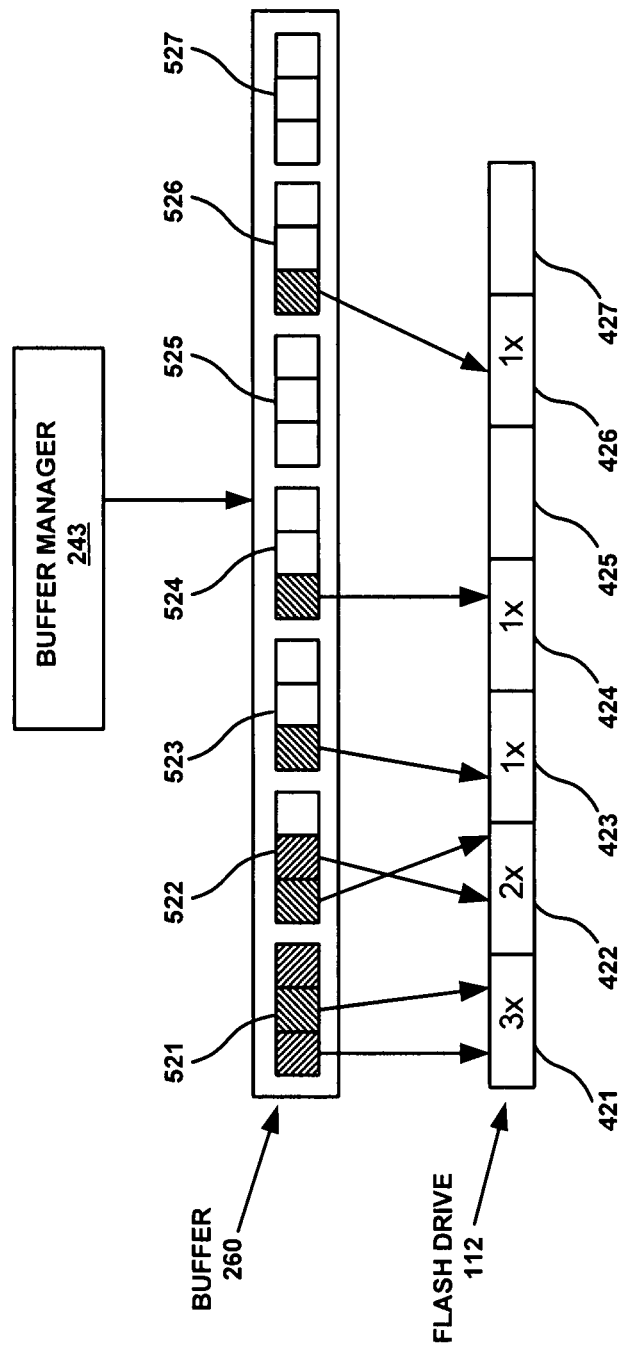
FIG. 5 shows another example of buffering management actions performed in accordance with an embodiment of the present technology.

FIG. 5 shows another example of buffering management actions performed in accordance with an embodiment of the present technology. FIG. 5 shows buffer manager 243 managing buffer 260 as a bucket type buffer. As shown by FIG. 5, buffer 260 is divided into buckets (521, 522, 523, 524, 525, 526, 527) that store writes between certain offsets within flash drive 112 (for example, to a particular cell or else to particular range of addresses which may be within a cell or spread across multiple cells of flash drive 112).

When a write is received for flash drive 112, buffer manager 243 places the write into an appropriate bucket for the allocated memory offset range. If no bucket for the write exists, buffer manager 243 starts a new bucket for writes with similar offsets, and the write operation is then buffered in this new bucket. Intercepted I/O requests which specify other write operations within the range of a bucket will be grouped together in the same bucket. While buffering is being performed, buffer manager 243 also resolves repeated and redundant data within each bucket, in the manner previously described.

Once a bucket becomes full or buffer threshold capacity is exceeded the accumulated writes in a bucket are written in batch to the appropriate cell or cells (421-427) which contain the offsets assigned to a particular bucket. One example of a buffer threshold being exceeded is a pre-specified level of fullness being reached by a particular bucket or by the entirety of buffer 260. Another example of a buffer threshold being exceeded is the expiration of a timer associated with buffer 260 or with a particular bucket or set of buckets in buffer 260. In FIG. 5, emptying buffer 260 results in three writes from bucket 521 to cell 421, two writes from bucket 522 to cell 422, one write from bucket 523 to cell 423, one write from bucket 524 to cell 424, and one write from bucket 526 to cell 426. As demonstrated by a comparison of FIG. 4 and FIG. 5, the bucket buffering method is more granular than the FIFO buffering method, as it stores more writes for a particular cell or portion of a cell and may allow more extensive resolution of the writes prior to commit than does the FIFO buffering method.

Example Methods of Operation

Figure 6:
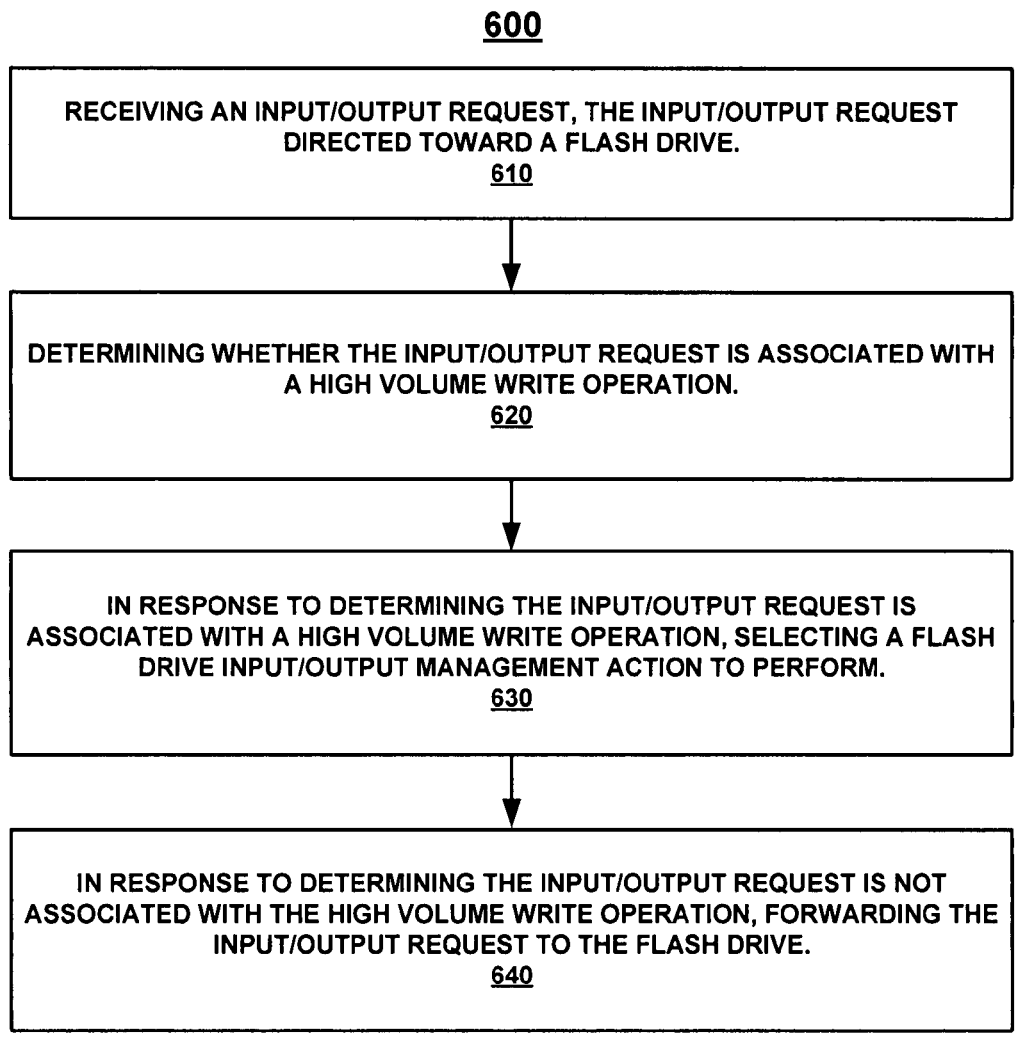
FIG. 6 is a flow diagram of operations performed in accordance with one embodiment of the present technology.

The following discussion sets forth in detail the operation of some example methods of operation of embodiments of the present technology for extending flash drive lifespan. With reference to FIG. 6 and FIG. 7, flow diagrams 600 and 700 each illustrate example steps used by various embodiments of the present technology for extending flash drive lifespan. Flow diagrams 600 and 700 include processes that, in various embodiments, are carried out by a processor under the control of computer-readable and computer-executable instructions. The computer-readable and computer-executable instructions reside, for example, in data storage features such as computer usable volatile memory 108, computer usable non-volatile memory 110, peripheral computer-readable media 102, and/or flash drive 112 of FIG. 1. The computer-readable and computer-executable instructions are used to control or operate in conjunction with, for example, processor 106A and/or processors 106A, 106B, and 106C of FIG. 1. Although specific steps are disclosed in flow diagrams 600 and 700, such steps are examples. That is, embodiments are well suited to performing various other steps or variations of the steps recited in flow diagrams 600 and 700. It is appreciated that the steps in flow diagrams 600 and 700 may be performed in an order different than presented, and that not all of the steps in flow diagrams 600 and 700 may be performed.

Filtering Input/Output Operations of a Flash Drive

FIG. 6 is a flow diagram 600 of operations performed in accordance with one embodiment of the present technology for extending flash drive lifespan. More specifically, FIG. 6 illustrates a flow diagram 600 of an example embodiment of a computer implemented method for filtering I/O operations of a flash drive, such as, for example flash drive 112. Elements of flow diagram 600 are explained below, with reference to elements of FIG. 1, FIG. 2, and FIG. 3, In one embodiment, step 610 of flow diagram 600 comprises receiving an input/output request which is directed toward a flash drive. As described by various examples herein, in one embodiment, this comprises flash drive filter 210 receiving an I/O request that is directed toward a flash drive, such as, for example, flash drive 112.

In one embodiment, step 620 of flow diagram 600 comprises determining whether the input/output request received at step 610 is associated with a high volume write operation. I/O nature determiner 220 makes this determination. Several specific examples of high volume write operations have been described herein. These examples include I/O requests related to paging files, prefetching, indexing, and registry writes. It is appreciated that these are but a few of many I/O requests which are associated with high volume write operations and which may be identified by I/O nature determiner 220 in the manner described herein. An example of the operation of I/O nature determiner 220 as related to determination of I/O requests associated with paging I/O requests is illustrated by the example of step 310 of flow diagram 300. It is appreciated that I/O nature determiner 220 operates similarly when evaluating a received I/O request for any one of a plurality of possible high volume write operations.

In one embodiment, in response to determining the input/output request is associated with a high volume write operation, step 630 of flow diagram 600 comprises selecting a flash drive input/output management action to perform. In one embodiment, this selecting is performed by flash drive I/O management selector 230, in the manner previously described herein. For example flash drive I/O management selector 230 selects a management action to perform based in part upon the nature of the I/O request and in part upon the available I/O managers (241, 242, 243, 244) that flash drive filter 210 is configured with.

Thus, as described by the embodiment of flash drive filter 210 represented in flow diagram 300, flash drive I/O management selector 230 selects a flash drive management action from the group of management actions consisting of managing compressing of data being written as a result of the I/O request, and managing decompressing of compressed data being read as a result of the I/O request.

Similarly, in an embodiment of flash drive filter 210 as illustrated in FIG. 2, flash drive I/O management selector 230 selects a flash drive management action from the group of management actions consisting of: managing compressing of data being written as a result of the I/O request, managing decompressing of compressed data being read as a result of the I/O request, managing buffering of the I/O request, and managing redirecting of the I/O request to a peripheral solid state storage drive.

It is appreciated that in some embodiments, as described herein, the selected I/O management action of managing compressing of data being written as a result the I/O request comprises writing compressed data of the I/O request to a buffer. This may be accomplished by compression manager 241 writing the compressed data to buffer 260, or by compression manager 241 accessing and utilizing buffer manager 243 to write the compressed data to buffer 260. Moreover, after the compressed data is written to buffer 260, compression manager 241 may further manage writing the compressed data from buffer 260 to flash drive 112.

It is also appreciated that in some embodiments, as described herein, the selected I/O management action of managing buffering of the I/O request further comprises writing of the data associated with the I/O request from a buffer to a peripheral storage. This may be accomplished by buffer manager 243 managing the writing of data from buffer 260 to peripheral storage 270. It is further appreciated that, in such an embodiment, peripheral storage 270 may be a solid state storage drive such as a memory card or a USB flash drive.

When multiple and potentially overlapping management actions are available for selection, flash drive I/O management selector 230 makes the selection based upon the nature of the I/O request and a comparison of the nature to a predefined set of rules. For example, in one such embodiment, all paging I/O write requests are sent to compression manager 241 so that data of the paging file associated with the operating system may be compressed, while all paging I/O read requests are sent to decompression manager 242 so that data of the paging file may be read and decompressed. Similarly, in such rule based embodiment, I/O write requests associated with an indexing operation are sent to compression manager 241 so that the data associated with a file of the indexing operation may be compressed prior to being written. Likewise, in such rule based embodiment, I/O write requests associated with a prefetching operation are sent to compression manager 241 so that the data of a file associated with the indexing operation may be compressed prior to being written. Further, in one such rule based embodiment, all registry file I/O requests are sent to buffer manager 243, while all other high volume write operations are sent to redirection manager 244 for redirection if a peripheral storage 270 is available.

In one embodiment, in response to determining the input/output request is not associated with a high volume write operation, step 640 of flow diagram 600 comprises forwarding the input/output request to the flash drive. Following the previous example, I/O nature determiner 220 of flash drive filter 210 forwards the I/O request on to flash drive 112 when it is determined that the I/O request is not associated with a high volume write operation.

Extending a Lifespan of a Flash Drive Used as Primary Storage for an Operating System FIG. 7 is a flow diagram 700 of operations performed in accordance with one embodiment of the present technology for extending flash drive lifespan. More specifically, FIG. 7 illustrates a flow diagram 700 of an example method of extending a lifespan of a flash drive used as primary storage for an operation system. Elements of flow diagram 700 are explained below, with reference to elements of FIG. 1, FIG. 2, and FIG. 3.

In one embodiment, step 710 of flow diagram 700 comprises receiving an input/output request which is directed toward a flash drive from an operating system. As described by various examples herein, in one embodiment, this comprises flash drive filter 210 receiving an I/O request that is directed toward a flash drive, such as, for example, flash drive 112. In one embodiment, the operating system utilizes flash drive 112 as a means of primary storage for activities performed in conjunction with running the operating system.

In one embodiment, step 720 of flow diagram 700 comprises determining a nature of the received I/O request. For example, in one embodiment, this comprises determining if the I/O request comprises data associated with a high volume write operation, such as, but not limited to: data related to a page file of the operating system, data related to a prefetching operation performed by the operating system, data related to a registry file of an operating system, and/or data related to an indexing operation performed by the operating system. In one embodiment, as described herein, I/O nature determiner 220 determines if the I/O request comprises data associated with such a high volume write operation.

In one embodiment, step 730 of flow diagram 700 comprises performing a flash drive I/O management action based on the nature of the I/O request, such that a number of write operations performed to the flash drive by the operating system is reduced while simultaneously maintaining the integrity of the operating system. As described herein, in one embodiment, this comprises compressing data associated with a high volume write operation. The integrity of the operating system is maintained by accurately managing the compression of the data such that no data is lost. In one embodiment the integrity of the operating system is also protected by ensuring that data vital to the functioning of the operating system is only stored on flash drive 112 and not redirected to peripheral storage 270 where it may be easily lost with the removal of peripheral storage 270 from the computer system (such as by removal of a portable flash drive). Additionally, in one embodiment, the integrity of the operating system is protected by encrypting the compressed data, especially in instances where it is redirected for storage on a peripheral storage 270 which is easily removed from the computer system.

In one embodiment, flash drive I/O management selector 230 selects compression manager 241. Compression manager 241 carries out this compression of data associated with a high volume write operation by directing data associated with the high volume write operation to data compression/decompression module 250 where the data is compressed into compressed data. In one embodiment, this may also include encrypting the compressed data. Flow diagram 300 describes one instantiation of such an embodiment.

In one embodiment, the compressed data of step 730 is written to a peripheral storage instead of to the flash drive. For example, in one embodiment, after the data is compressed, compression manager 241 manages the redirection of the compressed data such that the compressed data is written to peripheral storage 270 instead of to flash drive 112. Compression manager 241 may accomplish this redirection by accessing and utilizing redirection manager 244. In one embodiment, as described herein, peripheral storage 270 may be a solid state storage drive such as a memory card or a portable flash drive.

In one embodiment, the compressed data of step 730 is written to a buffer instead of to the flash drive. For example, in one embodiment, after the data associated with the I/O request is compressed, compression manager 241 manages the redirection and/or buffering of the compressed data such that the compressed data is written to buffer 260 instead of to flash drive 112. Compression manager 241 may accomplish this redirection and/or buffering by accessing and utilizing buffer manager 243 and/or redirection manager 244 or else by incorporating a similar functionality.

In one embodiment, the writing of the compressed data to a buffer also includes resolving a repeated, redundant, or overlapping version of the data into an updated compressed data; then, in response to a buffer threshold being exceeded, writing the updated compressed data from the buffer to the flash drive. In one embodiment, as described herein, the functionality of buffer manager 243 is accessed or incorporated by compression manager 241 to resolve compressed data that is stored in buffer 260 and to write the resolved data from buffer 260 to flash drive 112. In one embodiment, instead of writing the resolved data to flash drive 112, the resolved data may be redirected to peripheral storage 270 if peripheral storage 270 is available and if the resolved data is not of vital importance to the functioning of the operating system.

Example embodiments of the present technology for extending flash drive lifespan are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for filtering input/output operations of a flash drive, said method comprising:
   receiving an input/output request, said input/output request directed toward said flash drive; and
   performing at least one of:
      in response to determining said input/output request is associated with a high frequency write operation, selecting at least one flash drive input/output management action to perform from a group of flash drive management actions consisting of managing compressing of data being written as a result of said input/output request, managing decompressing of compressed data being read as a result of said input/output request, managing buffering of said input/output request, and managing redirecting of said input/output request to a peripheral solid state storage drive; or
      determining whether said input/output request is associated with a low importance write operation;
      in response to determining said input/output request is not associated with said low importance write operation, forwarding said input/output request to said flash drive; and
      in response to determining said input/output request is associated with said high frequency write operation and is not associated with said low importance write operation, deselecting said at least one flash drive input/output management action to perform.

2. The computer-implemented method as recited in claim 1, comprising determining if said input/output request is associated with at least one of a paging file, a prefetching operation, or a search indexing operation to determine if said input/output request is associated with said high frequency write operation.

3. The computer-implemented method as recited in claim 1, said at least one flash drive input/output management action comprising managing compressing of data being written as a result of said input/output request, said managing compressing of data comprising:
   compressing data of a paging file associated with an operating system.

4. The computer-implemented method as recited in claim 1, said at least one flash drive input/output management action comprising managing compressing of data being written as a result of said input/output request, said managing compressing of data comprising:
   compressing data of a file associated with a prefetching operation.

5. The computer-implemented method as recited in claim 1, said at least one flash drive input/output management action comprising managing compressing of data being written as a result of said input/output request, said managing compressing of data comprising:
   compressing data of a file associated with a search indexing operation.

6. The computer-implemented method as recited in claim 1, said at least one flash drive input/output management action comprising managing compressing of data being written as a result of said input/output request, said managing compressing of data comprising:
   writing compressed data of said input/output request to a buffer.

7. The computer-implemented method as recited in claim 6, said at least one flash drive input/output management action comprising managing compressing of data being written as a result of said input/output request, said managing compressing of data comprising:
   writing said compressed data from said buffer to said flash drive.

8. The computer-implemented method of claim 1, comprising writing data associated with said high frequency write operation to a buffer instead of to said flash drive.

9. A module for reducing write operations to a flash drive, said module comprising:
   a flash drive filter configured for coupling with said flash drive, said flash drive filter configured for intercepting an input/output request directed toward said flash drive, said flash drive filter comprising:
      an input/output nature determiner for determining a nature of said input/output request;
      a flash drive input/output management selector for selecting a flash drive input/output management action based at least in part upon said nature of said input/output request being associated with a high frequency write operation;
      a flash drive input/output manager, said flash drive input/output manager configured for managing performance of said flash drive input/output management action which contributes towards reducing write operations to said flash drive; and
      a buffer manager coupled to a buffer, said buffer manager configured to:
         receive said input/output request when said flash drive filter buffers said input/output request in said buffer; and
         resolve at least one of repeated data, redundant data, or overlapping written data within said buffer.

10. The module of claim 9, wherein said flash drive filter comprising:
   a coupling to a compression/decompression module, said compression/decompression module configured for compressing selected write operations directed toward said flash drive and decompressing compressed data read from said flash drive.

11. The module of claim 9, said flash drive input/output management selector configured to select said flash drive input/output management action based at least in part upon whether said input/output request is associated with a low importance write operation.

12. The module of claim 9, said buffer manager configured to write a first version of data from said buffer to said flash drive in response to an expiration of a time delay associated with said buffer.

13. The module of claim 9, said buffer manager configured to update a first version of data within said buffer upon determining a second version of said data is written to said buffer.

14. A computer-readable medium having computer-executable instructions for performing a method comprising:
   receiving an input/output request, said input/output request directed toward a flash drive;
   determining a nature of said input/output request; and
   performing at least one of the following based on said nature of said input/output request being associated with a high frequency write operation:
      performing a first flash drive input/output management action comprising:
         writing data associated with said high frequency write operation to a first buffer instead of to said flash drive; and
         in response to an expiration of a time delay associated with said first buffer, writing said data from said first buffer to said flash drive; or performing a second flash drive input/output management action comprising:
         compressing data associated with said high frequency write operation;
         writing said compressed data to a second buffer instead of to said flash drive;
         resolving a version of said compressed data that is at least one of repeated or overlapping into an updated compressed data; and
         in response to a buffer threshold associated with said second buffer being exceeded, writing said updated compressed data from said second buffer to said flash drive.

15. The computer-readable medium of claim 14, said determining a nature of said input/output request comprising computer-executable instructions for:
   determining if said input/output request comprises data associated with at least one of a paging file, a prefetching operation, or a search indexing operation.

16. The computer-readable medium of claim 14, at least one of said first buffer or said second buffer comprising one or more buckets.

17. The computer-readable medium of claim 16, respective buckets of said one or more buckets corresponding to one or more offsets.

18. The computer-readable medium of claim 14, comprising computer-executable instructions for:
   writing said compressed data to a peripheral solid state storage instead of to said flash drive.

19. The computer-readable medium of claim 9, said input/output request from an operating system.

20. The computer-readable medium of claim 19, a number of write operations performed to said flash drive by said operating system reduced while maintaining integrity of data associated with said high frequency write operation.

* * * * *